No. 831,745. PATENTED SEPT. 25, 1906.
L. E. RICE.
LOCKING DEVICE.
APPLICATION FILED NOV. 8, 1905.

WITNESSES:
Frank O'Connor
W. H. Pumphrey

INVENTOR
Louis E. Rice
BY
Geo. H. Benjamin
ATTORNEY

UNITED STATES PATENT OFFICE.

LOUIS EARL RICE, OF SALEM, OHIO, ASSIGNOR TO THE SILVER MANUFACTURING COMPANY, A CORPORATION OF OHIO.

LOCKING DEVICE.

No. 831,745.  Specification of Letters Patent.  Patented Sept. 25, 1906.

Application filed November 8, 1905. Serial No. 286,427.

*To all whom it may concern:*

Be it known that I, LOUIS EARL RICE, a citizen of the United States, residing at Salem, county of Columbiana, and State of Ohio, have invented certain new and useful Improvements in Locking Devices, of which the following is a specification.

My invention relates generally to locking devices, and particularly to a type suitable for operatively connecting two parts, members, or elements for the purpose of transmitting motion from one to the other or for arresting the motion of one or both parts.

As herein embodied, my invention is designed for use in locking a loosely-mounted wheel or equivalent part upon a driving or driven shaft and is so shown for purposes of illustration only, as it may obviously be readily adapted for various other uses. I wish it understood, therefore, that I do not limit myself to either the exact form or arrangement shown, as various changes may be made therein or other forms of the device employed operating in substantially the same manner to produce practically the same result.

Figure 1:
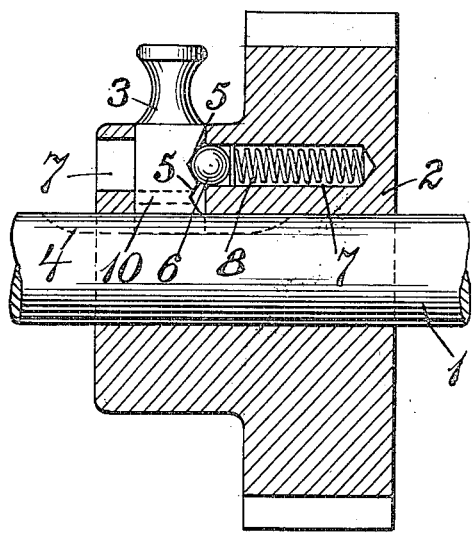
Figure 2:
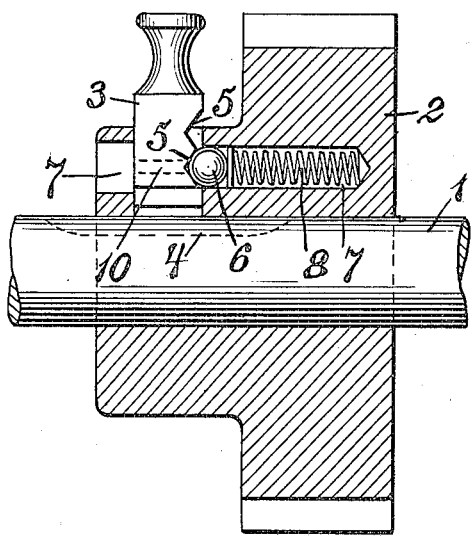
Figure 3:
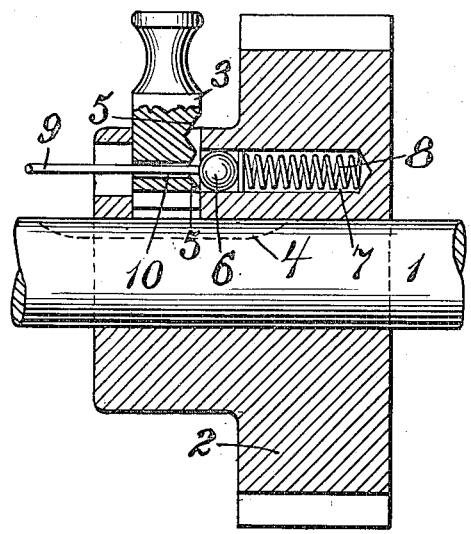
Figure 4:
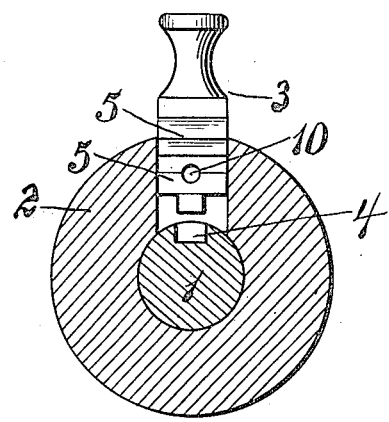

In the drawings, Figure 1 is a sectional view showing the device in position to lock a wheel upon its shaft. Fig. 2 is a similar view showing the device adjusted to permit the wheel to run free. Fig. 3 illustrates the manner of disconnecting the parts of the device, and Fig. 4 is a detail cross-section.

Referring now to the drawings, 1 represents a shaft, rod, or like part, and 2 a gear, pulley, sleeve, or the like loosely mounted thereon. As shown, the shaft may be either a driving or driven shaft, and in order that motion may be transmitted at will from the same to the wheel mounted thereon a locking device is employed which is self-holding in either of two positions of adjustment—that is to say, in or out of locked relation with the shaft. This device consists of a button-key 3, fitted in an opening in the hub of the wheel and having its inner end shaped to coöperate with a keyway 4 in the shaft, which latter serves, in a sense, as a keeper. The key has formed in one side thereof a series of recesses 5, the number depending upon the adjustments required. In the present instance only two of such recesses are shown, and engaging one or the other there is a locking-pin shown in the form of a ball 6, movable back and forth in a socket 7, formed in the wheel-hub and yieldingly held seated in the recess of the key by means of a spring 8.

For convenience in adjusting the key its outer projecting end is given a suitable shape to be readily grasped in the hand, and by moving the same from the position shown in Fig. 1 to that shown in Fig. 2 the ball 6 will be disengaged from the outer recess and caused to engage the inner one, in which position the wheel runs free. To lock the wheel upon the shaft, the key is readjusted by pressing the same inward toward the shaft, as will be at once apparent.

If for any reason it is desired to remove one or more of the parts of the locking device, the key is first adjusted to the position shown in Fig. 2, with the ball engaging the inner recess thereof. A wire 9 is then inserted in the open end of the socket, and upon being passed through an opening 10 in the key engages the ball 6 and forces the same into the socket in opposition to the spring, permitting the key to be withdrawn far enough to prevent the ball reëngaging therewith and permitting the key to be subsequently released upon the removal of the wire.

It will be observed that the metal between the recesses is cut away somewhat to permit the ball upon yielding slightly to pass readily from one to the other as the key is shifted; but owing to greater height of the shoulders at opposite ends of the recesses the engagement with the ball is more on the side than on the top, and as a result the ball does not yield to the pressure. The opposite ends of the recesses therefore constitute spaced stops and prevent the removal of the key otherwise than in the manner provided for.

As above stated, the device is not limited in its application, but may be adapted and employed for various other purposes to operatively connect two members, both of which may be normally movable or stationary or one stationary and the other movable. It may also be desirable for certain purposes to give the key more than two adjustments, which may be readily done by increasing the number of recesses, as above suggested. As all such changes are obvious and involve only the mere duplication of parts and unimportant details of construction, further description thereof is not herein deemed necessary.

Having thus described my invention, I claim—

1. A locking device comprising a keeper, a coöperating bolt movable relative thereto, said bolt being provided with spaced stops and a plurality of recesses between the stops, and a yieldingly-mounted member coöperating with the recesses to hold the bolt as adjusted and with the stops to limit the movement of the bolt.

2. A locking device comprising a keeper, a bolt movable relative thereto, said bolt being provided with spaced stops and a plurality of recesses between the stops, and a spring-advanced member having a rounded extremity coöperating with the recesses to hold the bolt as adjusted and with the stops to limit the movement of the bolt.

3. A locking device comprising a keeper, a bolt movable relative thereto, said bolt being provided with spaced stops and a plurality of recesses between the stops, and a spring-pressed ball coöperating with the recesses to hold the bolt as adjusted and with the stops to limit the movement of the bolt.

4. A locking device comprising a keeper, a bolt, requisite guides in which the bolt is movable relative to the keeper, said bolt being provided with spaced stops and a plurality of recesses between the stops, a yieldingly-mounted member coöperating with the recesses to hold the bolt as adjusted and with the stops to limit the movement of the bolt, and said bolt being provided with means whereby the yieldingly-mounted member may be disengaged from said stops.

5. A locking device comprising a rotary keeper, a movable bolt, said bolt being provided with spaced stops and a plurality of recesses between the stops, and means coöperating with the recesses to yieldingly hold the bolt as adjusted and with the stops to positively limit the movement of the bolt.

6. The combination of a shaft having a keyway formed therein, a wheel loosely mounted upon the shaft and a locking device carried by the wheel comprising a bolt movable into and out of engagement with the keyway in the shaft, said bolt being provided with spaced stops and a plurality of recesses between the stops, and a yieldingly-mounted member coöperating with the recesses to hold the bolt as adjusted and with the stops to limit the movement of the bolt.

In testimony whereof I affix my signature in the presence of two witnesses.

LOUIS EARL RICE.

Witnesses:
MABEL BEESON,
GEO. W. SHEEHAN.